US010713530B2

(12) United States Patent
Konishi

(10) Patent No.: US 10,713,530 B2
(45) Date of Patent: Jul. 14, 2020

(54) IMAGE PROCESSING APPARATUS, IMAGE PROCESSING METHOD, AND IMAGE PROCESSING PROGRAM

(71) Applicant: OMRON Corporation, Kyoto-shi, Kyoto (JP)

(72) Inventor: Yoshinori Konishi, Souraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 232 days.

(21) Appl. No.: 15/902,332

(22) Filed: Feb. 22, 2018

(65) Prior Publication Data
US 2018/0260661 A1   Sep. 13, 2018

(30) Foreign Application Priority Data

Mar. 13, 2017   (JP) ................................. 2017-047271

(51) Int. Cl.
*G06K 9/00*   (2006.01)
*G06K 9/62*   (2006.01)

(52) U.S. Cl.
CPC ....... *G06K 9/6255* (2013.01); *G06K 9/00208* (2013.01); *G06K 9/6202* (2013.01); *G06K 9/6251* (2013.01); *G06K 2209/19* (2013.01)

(58) Field of Classification Search
CPC ............... G06K 9/6255; G06K 9/6202; G06K 9/00208; G06K 9/6251; G06K 2209/19; G06T 3/40; G06T 3/0031; G06F 9/5027
(Continued)

(56) References Cited

U.S. PATENT DOCUMENTS

2003/0184567 A1* 10/2003 Fujiki ..................... G06T 3/40
                                                          345/660
2006/0082644 A1*  4/2006 Tsubaki ............. H04N 13/282
                                                           348/42
(Continued)

FOREIGN PATENT DOCUMENTS

JP           3066173 B2      7/2000

OTHER PUBLICATIONS

Munoz E et al., "Fast 6D Pose from a Single RGB Image using Cascaded Forests Templates", 2016 IEEE/RSJ International Conference on Intelligent Robots and Systems (IROS), IEEE, Oct. 9, 2016, pp. 4062-4069, XP033011948, Korea [retrieved on Nov. 28, 2016] Relevance is indicated in the extended European search report dated Jul. 20, 2018.
(Continued)

*Primary Examiner* — Van D Huynh
(74) *Attorney, Agent, or Firm* — Metrolex IP Law Group, PLLC

(57) ABSTRACT

An image processing apparatus includes a scale-down factor determination unit that generates two-dimensional images of an object viewed from a plurality of viewpoints using three-dimensional data representing a three-dimensional shape of the object and determines a scale-down factor for each viewpoint, a template generation unit that scales down the generated two-dimensional image from each viewpoint using the scale-down factor determined for the viewpoint and calculates a feature quantity from a scaled-down image to generate a template, and a template information output unit that outputs, for each viewpoint, the template and the scale-down factor used for generating the template in a manner associated with each other.

18 Claims, 6 Drawing Sheets

(58) Field of Classification Search
USPC .......................................................... 382/159
See application file for complete search history.

(56) References Cited

U.S. PATENT DOCUMENTS

2016/0261852 A1* 9/2016 Hirasawa ................ G01C 11/30
2017/0372466 A1* 12/2017 Hirota ....................... G06T 7/75

OTHER PUBLICATIONS

Munoz E et al., "Fast 6D Pose Estimation for Texture-less Objects from a single RGB image" 2016 IEEE International Conference on Robotics and Automation (ICRA), IEEE, May 16, 2016, pp. 5623-5630, XP032908804, Sweden [retrieved on Jun. 8, 2016] Relevance is indicated in the extended European search report dated Jul. 20, 2018.

The extended European search report dated Jul. 20, 2018 in the counterpart European patent application.

* cited by examiner

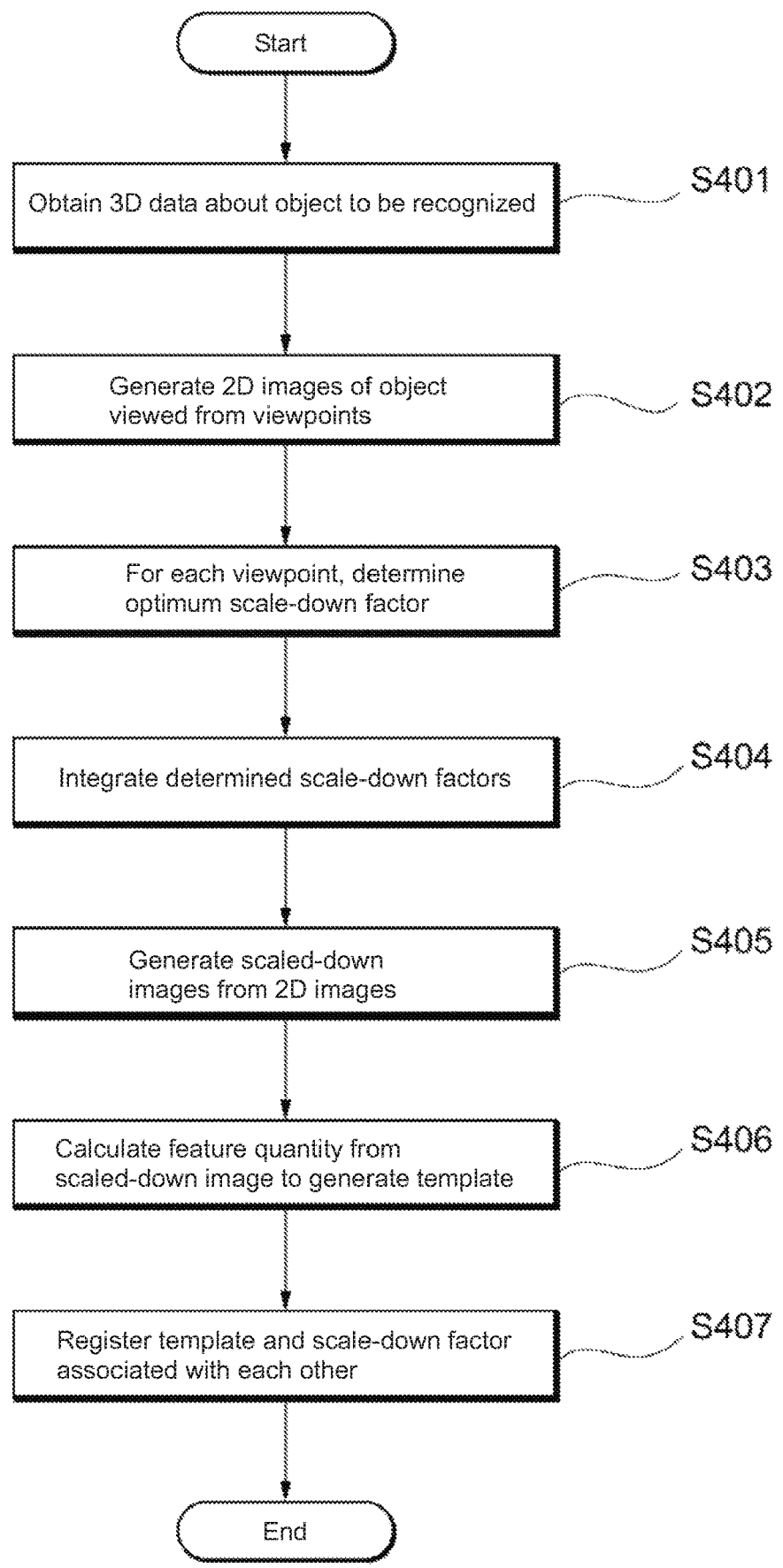

IMAGE PROCESSING APPARATUS, IMAGE PROCESSING METHOD, AND IMAGE PROCESSING PROGRAM

CROSS REFERENCE TO RELATED APPLICATIONS

This application claims priority from prior Japanese Patent Application No. 2017-047271 filed with the Japan Patent Office on Mar. 13, 2017, the entire contents of which are incorporated herein by reference.

FIELD

The disclosure relates to an image processing apparatus, an image processing method, and an image processing program.

BACKGROUND

Template matching is a method for detecting an object in an image. In basic template matching, a template for an object to be detected is prepared, and a degree of image feature matching is evaluated between an input image and the template to detect the position and posture of the object in the image. Object detection by template matching is practically used in, for example, inspection and picking in factory automation (FA), robot vision, and monitoring cameras. Faster template matching has recently been needed in response to requests for higher-resolution images and real-time processing of moving images.

To achieve faster template matching without lowering the accuracy of recognition, a reference image of an object to be detected and an input image are scaled down by the same scaling factor, and a degree of image feature matching is evaluated between the scaled-down images (refer to, for example, Patent Literature 1).

CITATION LIST

Patent Literature

Patent Literature 1: Japanese Patent No. 3066173

SUMMARY

Technical Problem

Template matching known in the art uses a predetermined scale-down factor. In three-dimensional object recognition for an object that appears greatly different when viewed from different viewpoints, a high scale-down factor corresponding to a viewpoint from which the object appears large can cause a low resolution in a template for a viewpoint from which the object appears small. This template cannot allow an optimum number of feature points to be extracted. This lowers the recognition accuracy. In contrast, a low scale-down factor corresponding to a viewpoint from which the object appears small can cause the resolution to be too high in a template for a viewpoint from which the object appears large. This template has too many feature points to be compared. This lowers the processing speed.

One or more aspects are directed to an image processing apparatus that performs an object recognition process using a scaled-down image with an optimum resolution for each viewpoint, an image processing method, and an image processing program.

Solution to Problem

A first aspect provides an image processing apparatus including a scale-down factor determination unit that generates two-dimensional images of an object viewed from a plurality of viewpoints using three-dimensional data representing a three-dimensional shape of the object and determines a scale-down factor for each viewpoint, a template generation unit that scales down the generated two-dimensional image from each viewpoint using the scale-down factor determined for the viewpoint and calculates a feature quantity from the scaled-down image to generate a template, and a template information output unit that outputs, for each viewpoint, the template and the scale-down factor used for generating the template in a manner associated with each other.

The structure according to this aspect determines a scale-down factor for each viewpoint of one object. In an object recognition process for an object that appears greatly different depending on the viewpoint, this structure allows faster processing of the central processing unit (CPU) without lowering the accuracy of recognition.

In the above image processing apparatus, the scale-down factor determination unit determines the scale-down factor based on the number of feature points included in the template for each viewpoint or an area of the object to be included in the scaled-down image from each viewpoint. The structure according to this aspect prevents variations in the recognition accuracy and the processing speed between viewpoints. The structure preventing variations in the recognition accuracy enables, for example, subsequent predetermined processing using the recognition result to be performed without being affected by the posture of the object, and increases the accuracy and the speed of the subsequent processing. The structure preventing variations in the processing speed between viewpoints further enables processing to be assigned to multiple CPUs efficiently and unwastefully when, for example, the recognition processing for each viewpoint is parallel processing.

In the above image processing apparatus, the scale-down factor determination unit may integrate the scale-down factors determined for the plurality of viewpoints. The structure according to this aspect enables batch processing in the image scale-down and feature quantity calculation in the object recognition process, and thus increases the processing speed of the CPU.

In the above image processing apparatus, the scale-down factor determination unit may select a reference viewpoint, classify viewpoints satisfying a predetermined condition defining a positional relationship with the reference viewpoint into the same group as for the reference viewpoint, and integrate the scale-down factors by assigning the same scale-down factor to the viewpoints included in the same group. The structure according to this aspect allows easy grouping by the object shape during the scale-down factor integration, and thus reduces the load on the CPU.

The above image processing apparatus further includes an image obtaining unit that obtains an input image, an image scale-down unit that scales down the obtained input image using the plurality of scale-down factors output by the template information output unit to generate a plurality of scaled-down input images, a feature quantity calculation unit that calculates a feature quantity from each of the generated scaled-down input images, where the feature quantity falls the same item as the feature quantity calculated by the template generation unit, and a template matching unit that searches for a position of the object in the scaled-down input image using the template and the feature quantity calculated by the feature quantity calculation unit from the scaled-down input image having the scale-down factor associated with the template, and obtains a plurality of comparison results, and a recognition output unit that outputs a recognition result obtained by integrating the plurality of comparison results.

In an object recognition process for an object that appears greatly different depending on the viewpoint, the structure according to this aspect increases the processing speed of the CPU without lowering the accuracy of recognition. In addition, outputting the recognition obtained by integrating multiple comparison results allows, for example, subsequent processing using the recognition result to serve efficiently based on the position at which the object is recognized.

In the above image processing apparatus, the comparison results include coordinates of the object recognized in each scaled-down input image and a comparison score representing a degree of image feature matching between the scaled-down input image and the template on the coordinates, and for different comparison results output on the same coordinates, the recognition output unit determines a template having the highest comparison score being recognized on the coordinates, and outputs the recognition result. The structure according to this aspect can handle different comparison results output on the same coordinates in a mode of determining a scale-down factor for each viewpoint of one object.

Another aspect provides an image processing method that is implemented by a computer. The method includes generating two-dimensional images of an object viewed from a plurality of viewpoints using three-dimensional data representing a three-dimensional shape of the object, determining a scale-down factor for each viewpoint, scaling down the generated two-dimensional image from each viewpoint using the scale-down factor determined for the viewpoint, calculating a feature quantity from the scaled-down image to generate a template, and outputting, for each viewpoint, the template and the scale-down factor used for generating the template in a manner associated with each other.

The above image processing method may further include obtaining an input image, scaling down the obtained input image using a plurality of the output scale-down factors to generate a plurality of scale-down input images, calculating a feature quantity from each of the generated scaled-down input images, where the feature quantity falls the same item as the feature quantity used to generate the template, searching for a position of the object in the scaled-down input image using the template and the feature quantity calculated from the scaled-down input image having the scale-down factor associated with the template, and obtaining a plurality of comparison results, and outputting a recognition result obtained by integrating the plurality of comparison results.

Another aspect provides a program enabling a computer to implement generating two-dimensional images of an object viewed from a plurality of viewpoints using three-dimensional data representing a three-dimensional shape of the object, determining a scale-down factor for each viewpoint, scaling down the generated two-dimensional image from each viewpoint using the scale-down factor determined for the viewpoint, calculating a feature quantity from the scaled-down image to generate a template, and outputting, for each viewpoint, the template and the scale-down factor used for generating the template in a manner associated with each other.

The above program may enable the computer to further implement obtaining an input image, scaling down the obtained input image using a plurality of the output scale-down factors to generate a plurality of scale-down input images, calculating a feature quantity from each of the generated scaled-down input images, the feature quantity being the same item as the feature quantity used to generate the template, searching for a position of the object in the scaled-down input image using the template and the feature quantity calculated from the scaled-down input image having the scale-down factor associated with the template, and obtaining a plurality of comparison results, and outputting a recognition result obtained by integrating the plurality of comparison results.

Advantageous Effects

The image processing apparatus, the image processing method, and the image processing program according to one or more aspects enable object recognition using a scaled-down image with an optimum resolution for each viewpoint of one object by determining an optimum scale-down factor for each viewpoint.

BRIEF DESCRIPTION OF THE DRAWINGS

FIG. 4 is a flowchart illustrating a template registration process performed by a template generation apparatus.

DETAILED DESCRIPTION

Embodiments will now be described with reference to the accompanying drawings. The embodiments intend to facilitate understanding of the present invention and do not limit the present invention. The embodiments may be modified variously without departing from the spirit and scope of the invention. Further, those skilled in the art will achieve other embodiments in which the elements described below are replaced with their equivalents. Such embodiments also fall within the scope of the present invention.

Overall Configuration of Object Recognition Apparatus

Figure 1:
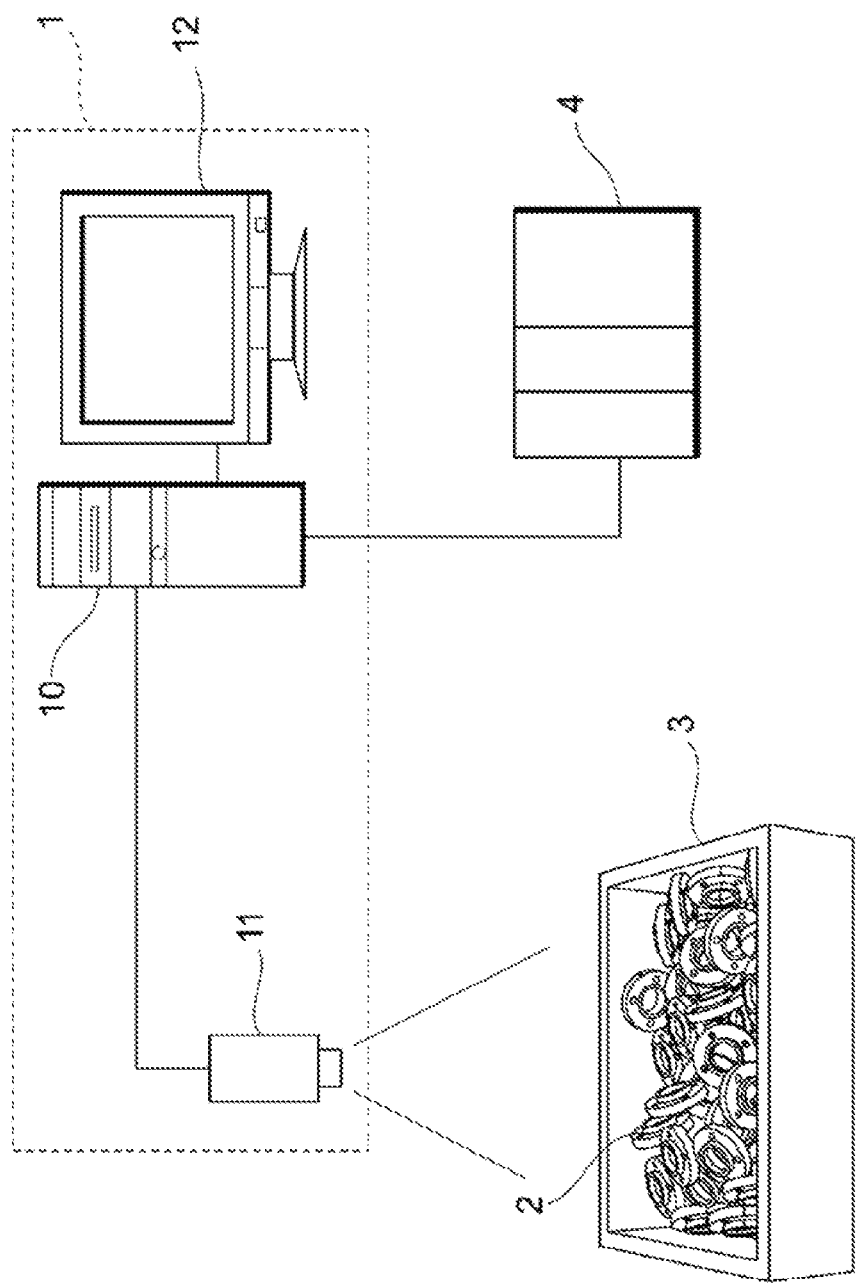
FIG. 1 is a diagram illustrating the overall configuration of an object recognition apparatus.

Referring now to FIG. 1, the overall configuration of an object recognition apparatus according to one or more embodiments and its applications will be described.

An object recognition apparatus 1 is a system installed on, for example, a production line. The object recognition apparatus 1 recognizes objects 2 in a tray 3 using images captured with a camera 11. The objects 2 to be recognized are randomly placed in the tray 3. The object recognition apparatus 1 captures an image with the camera 11 at predetermined time intervals, causes an image processing apparatus 10 to recognize the position and posture of each object 2 included in the image, and outputs the recognition result to, for example, a programmable logic controller (PLC) 4 or to a display 12. The recognition result output from the object recognition apparatus 1 is used in, for example, controlling a picking robot, a machining device, and a printer, or inspecting and measuring the objects 2.

Hardware Configuration

Figure 2:
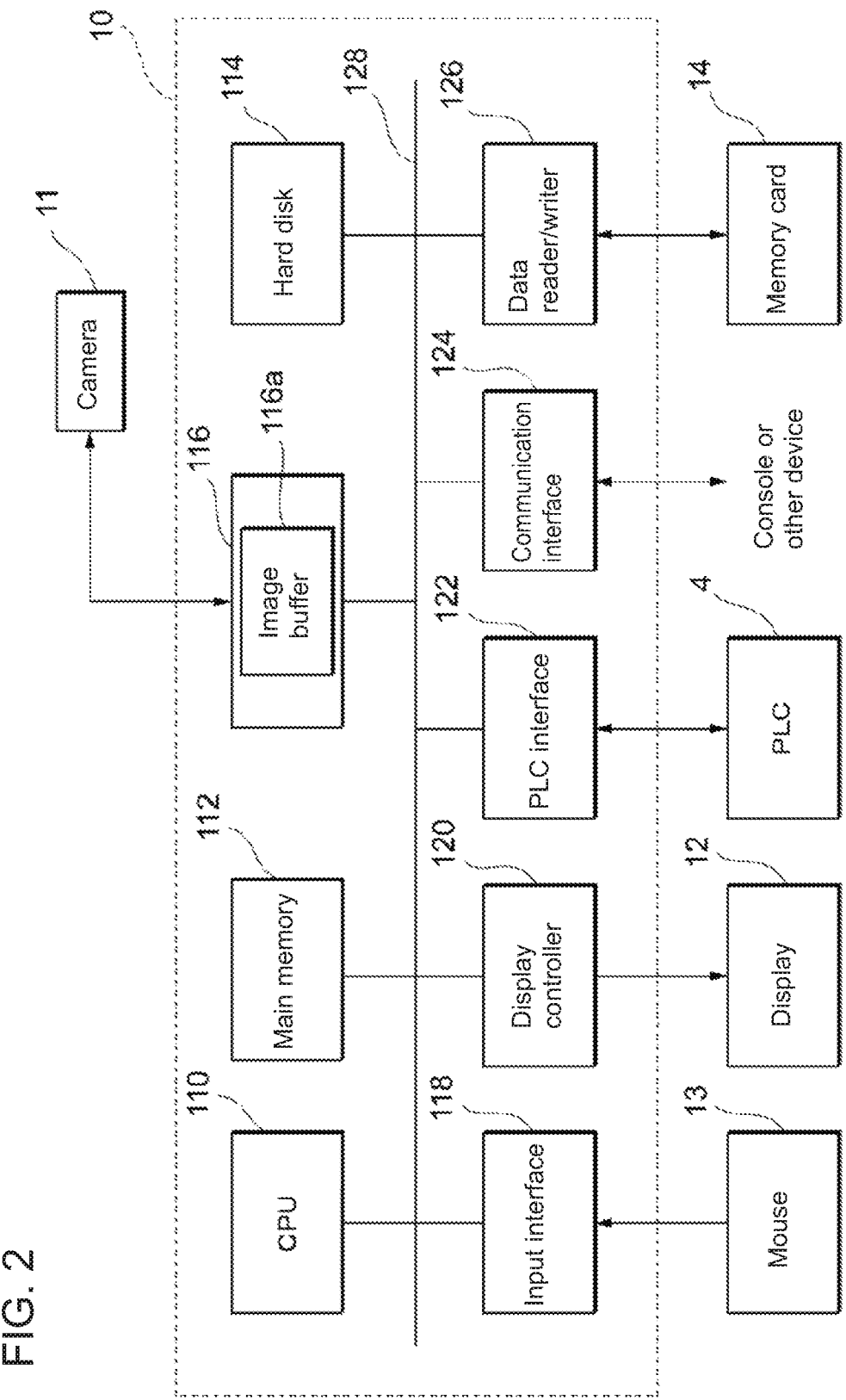
FIG. 2 is a diagram illustrating the hardware configuration of an object recognition apparatus.

Referring to FIG. 2, the hardware configuration of the object recognition apparatus 1 will now be described. The object recognition apparatus 1 mainly includes the camera 11 and the image processing apparatus 10.

The camera 11 is an imaging device for capturing a digital image of the objects 2, which is read into the image processing apparatus 10. The camera 11 may be a complementary metal-oxide semiconductor (CMOS) camera or a charge-coupled device (CCD) camera. The input image may have any resolution, either color or black-and-white mode, either static or dynamic mode, any gray-scale, and any data format, which may be selected in accordance with the type of the objects 2 and the purpose of sensing. When a special image other than a visible light image, such as an X-ray image or a thermography image, is used for object recognition or inspection, a camera dedicated to the image may be used.

The image processing apparatus 10 includes a central processing unit (CPU) 110, which functions as a hardware processor, a main memory 112 used as a working memory, a hard disk 114, which is a fixed storage, a camera interface 116, an input interface 118, a display controller 120, a PLC interface 122, a communication interface 124, and a data reader/writer 126. These components are interconnected by a bus 128 to allow data communication between them.

The camera interface 116 allows data transfer between the CPU 110 and the camera 11, and includes an image buffer 116a for temporarily storing image data obtained from the camera 11. The input interface 118 allows data transfer between the CPU 110 and an input unit. The input unit includes a mouse 13, a keyboard, a touch panel, and a jog controller. The display controller 120 is connected to the display 12, such as a liquid crystal monitor, and controls the information that appears on the display. The PLC interface 122 allows data transfer between the CPU 110 and the PLC 4. The communication interface 124 allows data transfer between the CPU 110 and a console or between the CPU 110 and a personal computer or a server. The data reader/writer 126 allows data transfer between the CPU 110 and a memory card 14, which is a recording medium.

The image processing apparatus 10 may be a computer with a general-purpose architecture, in which the CPU 110 reads and executes programs stored in the hard disk 114 or a memory card 14 to provide various functions. Such programs are distributed in the form of computer-readable recording mediums storing them, such as a memory card 14 or an optical disc, or provided through the Internet. The program used in one or more embodiments may be provided as a single application program or as a module incorporated in another program. The functions of the program may be partly or entirely replaced by a dedicated circuit such as an application specific integrated circuit (ASIC).

Functional Configuration

Figure 3:
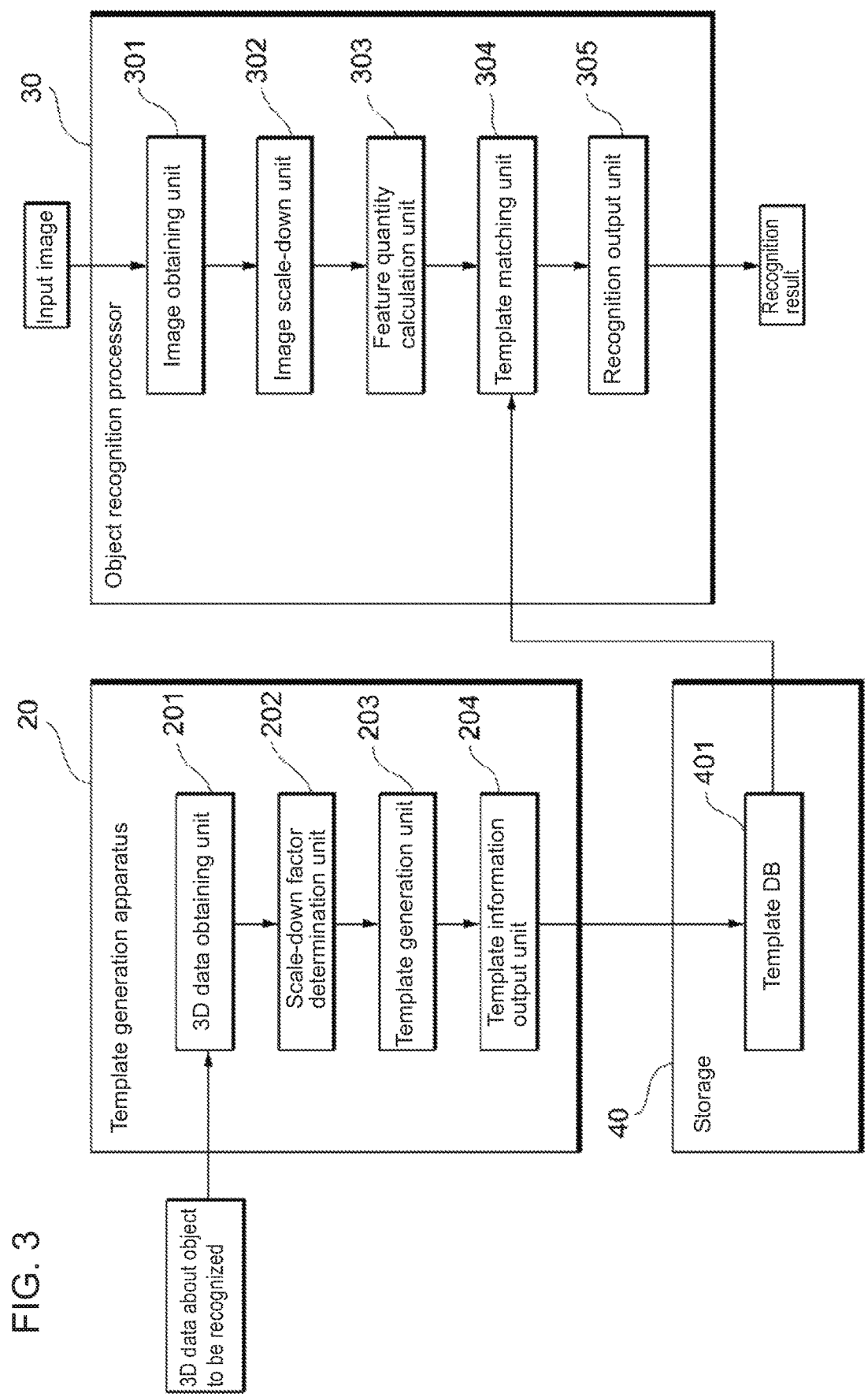
FIG. 3 is a functional block diagram illustrating an image processing apparatus.

FIG. 3 is a functional block diagram of the image processing apparatus 10. The image processing apparatus 10 includes a functional unit serving as a template generation apparatus 20, a functional unit serving as an object recognition processor 30, and a storage 40.

The template generation apparatus 20 is a functional unit that generates a template used in an object recognition process. The template generated by the template generation apparatus 20 is registered in a template database (DB) 401 in the storage 40. The object recognition processor 30 is a functional unit that recognizes an object in an image captured with the camera 11 by performing template matching of the image with the template registered in the template DB 401.

The template described herein is data representing the image feature of the objects 2 to be recognized. The template may be in any format such as feature quantity arrangement of multiple feature points in an image. The feature points are image coordinate positions corresponding to predetermined features such as the object boundary in an image, and curves and bends of the object contour.

The template generation apparatus 20 includes a 3D data obtaining unit 201, a scale-down factor determination unit 202, a template generation unit 203, and a template information output unit 204.

The 3D data obtaining unit 201 obtains three-dimensional data representing the three-dimensional shape of an object 2 to be recognized (target object). The 3D data obtaining unit 201 can obtain any three-dimensional data that allows recognition of the target object 2 as a three-dimensional figure. In one or more embodiments, the obtained three-dimensional data is three-dimensional CAD data. The 3D data obtaining unit 201 may obtain three-dimensional CAD data from an external three-dimensional CAD server or the storage 40.

The scale-down factor determination unit 202 generates two-dimensional images of the object 2 viewed from multiple viewpoints using the three-dimensional data obtained by the 3D data obtaining unit 201, and determines the optimum scale-down factor for each viewpoint. A higher scale-down factor allows faster processing, whereas a scale-down factor that is too high can lower the recognition accuracy as described above. Thus, each viewpoint has an appropriate scale-down factor determined based on a trade-off between the processing speed and the recognition accuracy. In one or more embodiments, the scale-down factor determination unit 202 can determine the scale-down factor to allow a template for each viewpoint to have at least a predetermined number of feature points and/or the object 2 included in the scaled-down image from each viewpoint to have a fixed area.

The scale-down factor determination unit 202 also integrates the scale-down factors determined for the viewpoints. For example, the scale-down factor determination unit 202 groups the scale-down factors for the multiple viewpoints in a manner that prevents the scale-down factor variations within each group from exceeding a predetermined threshold. The scale-down factor determination unit 202 then determines a scale-down factor for each group. The scale-down factor variations in each group are represented by values such as the standard deviation or variance of the scale-down factors. The scale-down factor determination unit 202 can group scale-down factors for multiple viewpoints using a predetermined clustering algorithm, such as k-means clustering.

The scale-down factor determination unit 202 may integrate the scale-down factors in a different manner, for example, based on the probability of close viewpoints providing similar views. In this case, the scale-down factor determination unit 202 may determine a scale-down factor depending on each viewpoint, or for example obtains a scale-down factor of 1 for viewpoints within a predetermined area including one reference viewpoint, and obtains a scale-down factor of 2 for viewpoints within a predetermined area containing another reference viewpoint.

The scale-down factor for each group may be determined by the scale-down factor determination unit 202 as a representative value such as the mean, median, or mode of the scale-down factors within the group. This grouping enables batch processing in the image scale-down and feature quantity calculation described later, which is performed by the object recognition processor 30, and thus enables faster processing.

The template generation unit 203 scales down the two-dimensional image from each viewpoint, which is generated by the scale-down factor determination unit 202, using the scale-down factor determined for the viewpoint. The template generation unit 203 then calculates a feature quantity extracted from each scaled-down image to generate a template. In the template generation, feature point detection and feature quantity calculation may be achieved by any known technique, and will not be described in detail herein.

Examples of the feature quantities include a pixel value (luminance), a luminance gradient orientation, a quantized gradient orientation, histograms of oriented gradients (Hog), HAAR-like, and scale-invariant feature transform (SIFT). The luminance gradient orientation is a continuous-value representation of gradient orientations (angles) of luminance in a local area around a feature point. The quantized gradient orientation is a discrete-value representation of gradient orientations (angles) of the luminance in a local area around a feature point (for example, eight directions are represented by 1-byte information corresponding to 0 to 7).

The template information output unit 204 associates, for each viewpoint, the template generated by the template generation unit 203 with the scale-down factor used for generating the template, and registers them in the template DB 401 in the storage.

The object recognition processor 30 includes an image obtaining unit 301, an image scale-down unit 302, a feature quantity calculation unit 303, a template matching unit 304, and a recognition output unit 305.

The image obtaining unit 301 obtains an input image from the camera 11. The image scale-down unit 302 scales down the input image obtained by the image obtaining unit 301 using each scale-down factor registered in the template DB 401 in the storage 40 to generate as many scaled-down input images as the number of scale-down factors registered in the template DB 401.

The feature quantity calculation unit 303 calculates a feature quantity for each scaled-down input image generated by the image scale-down unit 302. The calculated feature quantity is the same item as the feature quantity calculated by the template generation unit 203 in the template generation.

The template matching unit 304 uses each template registered in the template DB 401 and the feature quantity calculated by the feature quantity calculation unit 303 from the scaled-down input image having the scale-down factor associated with the template to search for the position of the object 2 in the scaled-down input image, and obtains multiple comparison results. More specifically, the template matching unit 304 performs a search the number of times equal to the number of templates registered in the template DB 401. In one or more embodiments, every template registered in the template DB is used to obtain, as comparison results, the coordinates of the object 2 recognized in each scaled-down input image and a comparison score on the coordinates. The comparison score represents a degree of image feature matching between the scaled-down input image and the template.

The recognition output unit 305 integrates the multiple comparison results obtained by the template matching unit 304 to output the final recognition result. In one or more embodiments, the recognition output unit 305 transforms the coordinates in the scaled-down input images into the coordinates in the original input image. For different comparison results output on the same coordinates, the template having the highest comparison score will be determined as being recognized on the coordinates, and the recognition result is output.

The storage 40 includes the template DB 401. The template DB 401 stores the template for each viewpoint and the scale-down factor of the template in a manner associated with each other. The template DB 401 may store multiple templates having the same scale-down factor because the scale-down factor determination unit 202 can integrate scale-down factors determined for viewpoints as described above.

Template Registration Process

Figure 5A:
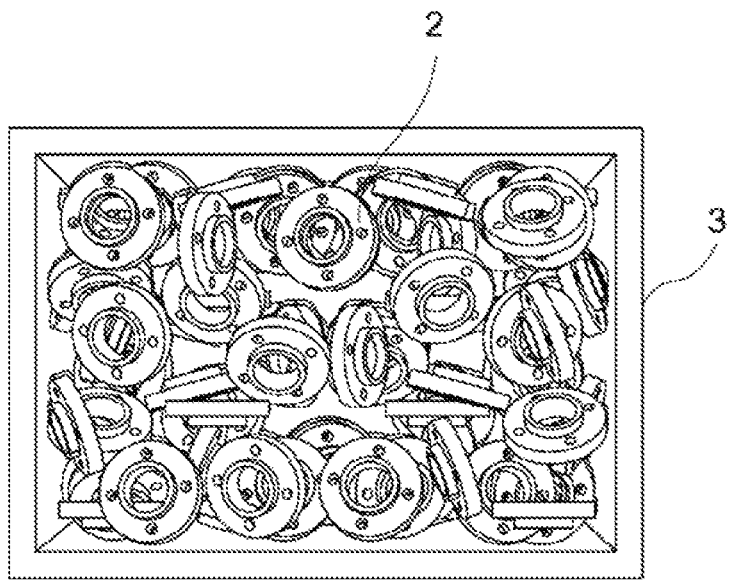
FIG. 5A is a diagram illustrating an input image captured with a camera.

A template registration process performed by the template generation apparatus 20 will be described with reference to the flowchart of FIG. 4. The template registration process shown in FIG. 4 is performed when another image processing apparatus 10 is installed or another object 2 is to be recognized. In one or more embodiments, templates used for recognizing the objects 2 shown in FIG. 5A are registered. As shown in FIG. 5A, an input image includes the multiple objects 2 at any positions and in any postures.

In step S401, the 3D data obtaining unit 201 in the template generation apparatus 20 obtains three-dimensional data about an object 2 to be recognized. In one or more embodiments, for example, the 3D data obtaining unit 201 obtains three-dimensional CAD data from an external three-dimensional CAD server.

Figure 5B:
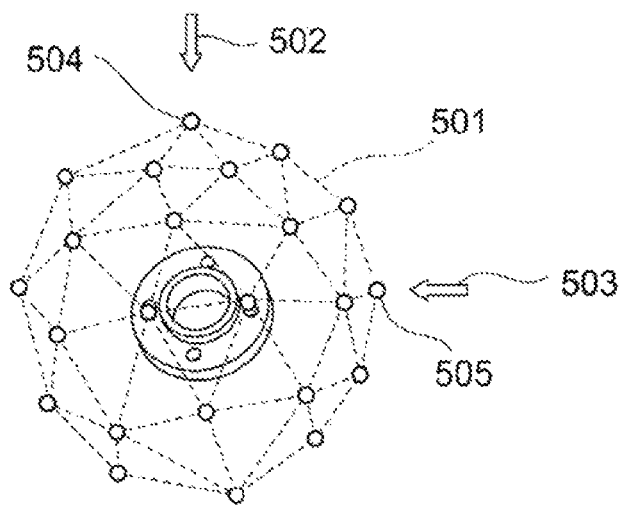
FIG. 5B is a diagram illustrating a conceptual view of generation of two-dimensional images of an object viewed from multiple viewpoints.
Figure 5C:
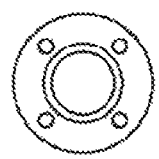
FIG. 5C is a diagram illustrating a two-dimensional image of an object viewed from one particular viewpoint.
Figure 5D:
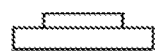
FIG. 5D is a diagram illustrating a two-dimensional image of an object viewed from another particular viewpoint.

In step S402, the scale-down factor determination unit 202 in the template generation apparatus 20 uses the three-dimensional data obtained by the 3D data obtaining unit 201 to generate two-dimensional images of the object viewed from multiple viewpoints. In one or more embodiments, the scale-down factor determination unit 202 uses the three-dimensional CAD data to generate two-dimensional images of the object 2 viewed from the vertexes of a polyhedron 501 including the object 2, for example, as shown in FIG. 5B. FIG. 5C shows a two-dimensional image of the object 2 viewed from above as indicated by an arrow 502. FIG. 5D shows a two-dimensional image of the object viewed laterally as indicated by an arrow 503.

In S403, the scale-down factor determination unit 202 determines, for each viewpoint, the optimum scale-down factor for the two-dimensional image from the viewpoint generated in S402. In one or more embodiments, the scale-down factor determination unit 202 can determine the scale-down factor based on the number of feature points included in the template for each viewpoint or the area of the object 2 to be included in the scaled-down image from each viewpoint.

In S404, the scale-down factor determination unit 202 further integrates the scale-down factors determined for the viewpoints. In one or more embodiments, for example, the scale-down factor determination unit 202 selects a reference viewpoint, and classifies viewpoints satisfying a predetermined condition defining the positional relationship with the reference viewpoint into the same group as the reference viewpoint. The scale-down factor determination unit 202 then integrates the scale-down factors by assigning the same scale-down factor to the viewpoints included in the same group. More specifically, for example, the scale-down factor determination unit 202 selects the viewpoint corresponding to the uppermost vertex 504 indicated by the arrow 502, and the viewpoint corresponding to the rightmost vertex 505 indicated by the arrow 503, as reference viewpoints. When three points of a particular reference viewpoint, the center of the polyhedron 501, and viewpoint 1 form an angle of 20 degrees or less, the scale-down factor determination unit 202 classifies viewpoint 1 into the same group as the reference viewpoint, and assigns the scale-down factor of the reference viewpoint to the viewpoints in the same group.

In S405, the template generation unit 203 in the template generation apparatus 20 scales down the two-dimensional image from each viewpoint generated by the scale-down factor determination unit 202 using the scale-down factor determined for the viewpoint in S403 or S404. In S406, the template generation unit 203 calculates a feature quantity from the scaled-down image to generate a template. In one or more embodiments, the template generation unit 203 scales down the two-dimensional image from each viewpoint generated by the scale-down factor determination unit 202 using the scale-down factor determined for the viewpoint in S403 or S404, and calculates quantized gradient orientations from the scaled-down image to generate a template.

In S407, the template information output unit 204 in the template generation apparatus 20 finally associates the template generated for each viewpoint by the template generation unit 203 with the scale-down factor used for generating the template, and registers them in the template DB 401 in the storage 40. In one or more embodiments, the template generation unit 203 associates, for each viewpoint, the arrangement data representing the quantized gradient orientations of multiple feature points calculated in S406 with the scale-down factor and registers them.

Object Recognition Process

Figure 6:
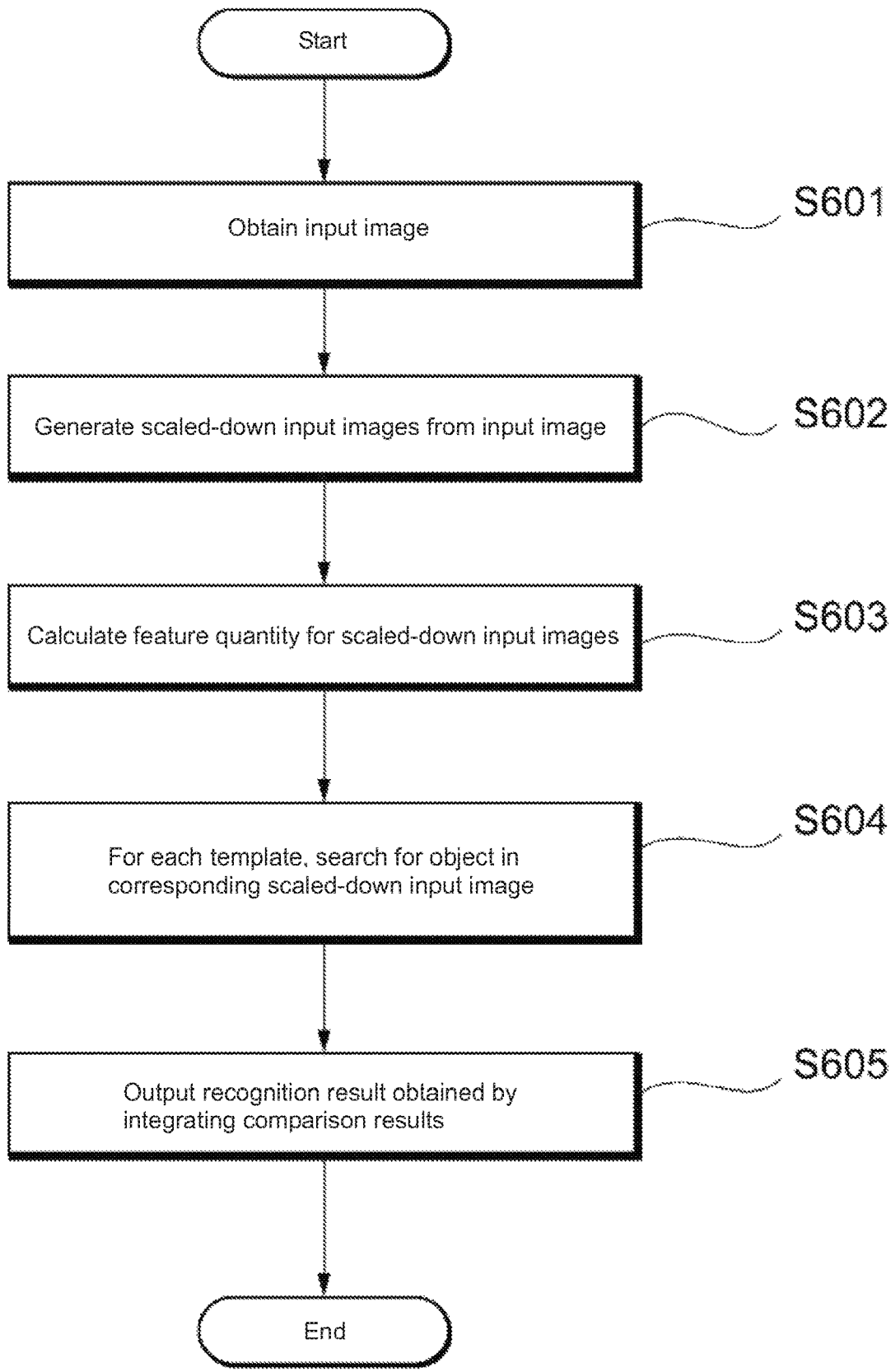
FIG. 6 is a flowchart illustrating an object recognition process performed by an object recognition processor.

An object recognition process performed by the object recognition processor 30 will now be described with reference to the flowchart of FIG. 6.

In step S601, the image obtaining unit 301 in the object recognition processor 30 obtains an input image from the camera 11. In step S602, the image scale-down unit 302 in the object recognition processor 30 then scales down the input image obtained by the image obtaining unit 301 using each scale-down factor registered in the template DB 401 in the storage 40 to generate as many scaled-down input images as the number of scale-down factors registered in the template DB 401.

In step S603, the feature quantity calculation unit 303 in the object recognition processor 30 calculates a feature quantity for each scaled-down input image generated by the image scale-down unit 302. The calculated feature quantity is the same item as the feature quantity calculated by the template generation unit 203 in the template generation. In one or more embodiments, the feature quantity is quantized gradient orientations.

In step S604, the template matching unit 304 in the object recognition processor 30 then uses each template registered in the template DB 401 and the feature quantity calculated by the feature quantity calculation unit 303 from the scaled-down input image having the scale-down factor associated with the template to search for the position of the object 2 in the scaled-down input image, and obtains multiple comparison results. More specifically, the template matching unit 304 performs a search the number of times equal to the number of templates registered in the template DB 401. In one or more embodiments, every template registered in the template DB is used to obtain, as comparison results, the coordinates of the object 2 recognized in each scaled-down input image and a comparison score on the coordinates. The comparison score represents a degree of image feature matching between the scaled-down input image and the template.

In step S605, the recognition output unit 305 in the object recognition processor 30 finally integrates the multiple comparison results obtained by the template matching unit 304 to output the final recognition result. In one or more embodiments, the recognition output unit 305 transforms the coordinates in the scaled-down input images into the coordinates in the original input image. For different comparison results output on the same coordinates, the template having the highest comparison score will be determined as being recognized on the coordinates, and the recognition result will be output.

The template matching according to one or more embodiments is not limited to a particular technique. The object recognition processor 30 may use any technique of template matching. In one or more embodiments, the object recognition processor 30 recognizes an object based on quantized gradient orientations. However, the object recognition processor 30 may recognize an object based on other feature quantities or by directly using pixel values such as luminances and colors. Those skilled in the art will readily understand that the template generation apparatus 20 may generate templates appropriate for template matching used in the object recognition processor 30. Any algorithm may be used to speed up the coarse-to-fine search or other processing.

Also, the program for implementing each processing described herein may be stored in a recording medium. The recording medium may be used to install the program in the image processing apparatus 10. The recording medium storing the program may be a non-transitory recording medium. The non-transitory recording medium may be any recording medium, such as a CD-ROM.

The above one or more embodiments may be partially or entirely expressed in, but not limited to, the following forms.

APPENDIX 1

An image processing apparatus comprising at least one memory and at least one hardware processor connected to the memory, the hardware processor being configured to generate two-dimensional images of an object viewed from a plurality of viewpoints using three-dimensional data representing a three-dimensional shape of the object and determine a scale-down factor for each viewpoint;

scale down the generated two-dimensional image from each viewpoint using the scale-down factor determined for the viewpoint and calculate a feature quantity from the scaled-down image to generate a template; and output, for each viewpoint, the template and the scale-down factor used for generating the template in a manner associated with each other.

APPENDIX 2

An image processing method implemented by at least one hardware processor, the method comprising:

generating two-dimensional images of an object viewed from a plurality of viewpoints using three-dimensional data representing a three-dimensional shape of the object and determining a scale-down factor for each viewpoint;

scaling down the generated two-dimensional image from each viewpoint using the scale-down factor determined for the viewpoint and calculating a feature quantity from the scaled-down image to generate a template; and outputting, for each viewpoint, the template and the scale-down factor used for generating the template in a manner associated with each other.

REFERENCE SIGNS LIST 1 object recognition apparatus
2 object
3 tray
4 PLC
10 image processing apparatus
11 camera
12 display
13 mouse
14 memory card
112 main memory
114 hard disk
116 camera interface
116a image buffer
118 input interface
120 display controller
122 PLC interface
124 communication interface
126 data reader/writer
128 bus
20 template generation apparatus
201 3D data obtaining unit
202 scale-down factor determination unit
203 template generation unit
204 template information output unit
30 object recognition processor
301 image obtaining unit
302 image scale-down unit
303 feature quantity calculation unit
304 template matching unit
305 recognition output unit
40 storage
401 template DB
501 polyhedron
502 arrow
503 arrow
504 uppermost vertex
505 rightmost vertex

The invention claimed is:

1. An image processing apparatus, comprising a processor configured with a program to perform operations comprising:

operation as a scale-down factor determination unit configured to generate two-dimensional images of an object viewed from a plurality of viewpoints using three-dimensional data representing a three-dimensional shape of the object and determine a scale-down factor for each viewpoint;

operation as a template generation unit configured to generate, for each of the two-dimensional images from each viewpoint, a scaled-down image, using the scale-down factor determined for the viewpoint and calculate, for each viewpoint, a feature quantity from the scaled-down image to generate a template; and operation as a template information output unit configured to output, for each viewpoint, the template and the scale-down factor used for generating the template in a manner associated with each other.

2. The image processing apparatus according to claim 1, wherein the processor is configured with the program such that operation as the scale-down factor determination unit comprises operation as the scale-down factor determination unit that determines the scale-down factor based on the number of feature points included in the template for each viewpoint or an area of the object to be included in the scaled-down image from each viewpoint.

3. The image processing apparatus according to claim 1, wherein the processor is configured with the program such that operation as the scale-down factor determination unit comprises operation as the scale-down factor determination unit that integrates the scale-down factors determined for the plurality of viewpoints.

4. The image processing apparatus according to claim 3, wherein the processor is configured with the program such that operation as the scale-down factor determination unit comprises operation as the scale-down factor determination unit that selects a reference viewpoint, classifies viewpoints satisfying a predetermined condition defining a positional relationship with the reference viewpoint into the same group as for the reference viewpoint, and integrates the scale-down factors by assigning the same scale-down factor to the viewpoints included in the same group.

5. The image processing apparatus according to claim 1, wherein the processor is configured with the program to perform operations further comprising:

operation as an image obtaining unit configured to obtain an input image;

operation as an image scale-down unit configured to scale down the obtained input image using the plurality of scale-down factors output by the template information output unit to generate a plurality of scaled-down input images;

operation as a feature quantity calculation unit configured to calculate a feature quantity from each of the generated scaled-down input images, the feature quantity being the same item as the feature quantity calculated by the template generation unit;

operation as a template matching unit configured to search for a position of the object in the scaled-down input image using the template and the feature quantity calculated by the feature quantity calculation unit from the scaled-down input image having the scale-down factor associated with the template, and obtain a plurality of comparison results; and operation as a recognition output unit configured to output a recognition result obtained by integrating the plurality of comparison results.

6. The image processing apparatus according to claim 5, wherein the comparison results comprise coordinates of the object recognized in each scaled-down input image and a comparison score representing a degree of image feature matching between the scaled-down input image and the template on the coordinates, and the processor is configured with the program such that, for different comparison results output on the same coordinates, the recognition output unit determines a template having the highest comparison score being recognized on the coordinates, and outputs the recognition result.

7. An image processing method that is implemented by a computer, the method comprising:
- generating two-dimensional images of an object viewed from a plurality of viewpoints using three-dimensional data representing a three-dimensional shape of the object;
- determining a scale-down factor for each viewpoint;
- generating, for each of the two-dimensional images from each viewpoint, a scaled-down image using the scale-down factor determined for the viewpoint;
- calculating, for each viewpoint, a feature quantity from the scaled-down image to generate a template; and
- outputting, for each viewpoint, the template and the scale-down factor used for generating the template in a manner associated with each other.

8. The image processing method according to claim 7, further comprising:
- obtaining an input image;
- scaling down the obtained input image using a plurality of the output scale-down factors to generate a plurality of scaled-down input images;
- calculating a feature quantity from each of the plurality of scaled-down images, the feature quantity being the same item as the feature quantity used to generate the template;
- searching for a position of the object in the scaled-down input image using the template and the feature quantity calculated from the scaled-down input image having the scale-down factor associated with the template, and obtaining a plurality of comparison results; and
- outputting a recognition result obtained by integrating the plurality of comparison results.

9. A non-transitory computer-readable recording medium storing a program causing a computer to perform operations comprising:
- generating two-dimensional images of an object viewed from a plurality of viewpoints using three-dimensional data representing a three-dimensional shape of the object;
- determining a scale-down factor for each viewpoint;
- generating, for each of the two-dimensional image images from each viewpoint, a scaled-down image using the scale-down factor determined for the viewpoint;
- calculating, for each viewpoint, a feature quantity from the scaled-down image to generate a template; and
- outputting, for each viewpoint, the template and the scale-down factor used for generating the template in a manner associated with each other.

10. The non-transitory computer-readable recording medium according to claim 9, storing the program causing the computer to perform operations further comprising:
- obtaining an input image;
- scaling down the obtained input image using a plurality of the output scale-down factors to generate a plurality of scaled-down input images;
- calculating a feature quantity from each of the plurality of scaled-down images, the feature quantity being the same item as the feature quantity used to generate the template;
- searching for a position of the object in the scaled-down input image using the template and the feature quantity calculated from the scaled-down input image having the scale-down factor associated with the template, and obtaining a plurality of comparison results; and
- outputting a recognition result obtained by integrating the plurality of comparison results.

11. The image processing apparatus according to claim 2, wherein
- the processor is configured with the program such that operation as the scale-down factor determination unit comprises operation as the scale-down factor determination unit that integrates the scale-down factors determined for the plurality of viewpoints.

12. The image processing apparatus according to claim 11, wherein
- the processor is configured with the program such that operation as the scale-down factor determination unit comprises operation as the scale-down factor determination unit that selects a reference viewpoint, classifies viewpoints satisfying a predetermined condition defining a positional relationship with the reference viewpoint into the same group as for the reference viewpoint, and integrates the scale-down factors by assigning the same scale-down factor to the viewpoints included in the same group.

13. The image processing apparatus according to claim 2, wherein the processor is configured with the program to perform operations further comprising:
- operation as an image obtaining unit configured to obtain an input image;
- operation as an image scale-down unit configured to scale down the obtained input image using the plurality of scale-down factors output by the template information output unit to generate a plurality of scaled-down input images;
- operation as a feature quantity calculation unit configured to calculate a feature quantity from each of the generated scaled-down input images, the feature quantity being the same item as the feature quantity calculated by the template generation unit;
- operation as a template matching unit configured to search for a position of the object in the scaled-down input image using the template and the feature quantity calculated by the feature quantity calculation unit from the scaled-down input image having the scale-down factor associated with the template, and obtain a plurality of comparison results; and
- operation as a recognition output unit configured to output a recognition result obtained by integrating the plurality of comparison results.

14. The image processing apparatus according to claim 13, wherein
- the comparison results comprise coordinates of the object recognized in each scaled-down input image and a comparison score representing a degree of image feature matching between the scaled-down input image and the template on the coordinates, and
- the processor is configured with the program such that, for different comparison results output on the same coordinates, the recognition output unit determines a template having the highest comparison score being recognized on the coordinates, and outputs the recognition result.

15. The image processing apparatus according to claim 3, wherein the processor is configured with the program to perform operations further comprising:
- operation as an image obtaining unit configured to obtain an input image;
- operation as an image scale-down unit configured to scale down the obtained input image using the plurality of scale-down factors output by the template information output unit to generate a plurality of scaled-down input images;

operation as a feature quantity calculation unit configured to calculate a feature quantity from each of the generated scaled-down input images, the feature quantity being the same item as the feature quantity calculated by the template generation unit;

operation as a template matching unit configured to search for a position of the object in the scaled-down input image using the template and the feature quantity calculated by the feature quantity calculation unit from the scaled-down input image having the scale-down factor associated with the template, and obtain a plurality of comparison results; and operation as a recognition output unit configured to output a recognition result obtained by integrating the plurality of comparison results.

16. The image processing apparatus according to claim 15, wherein the comparison results comprise coordinates of the object recognized in each scaled-down input image and a comparison score representing a degree of image feature matching between the scaled-down input image and the template on the coordinates, and the processor is configured with the program such that, for different comparison results output on the same coordinates, the recognition output unit determines a template having the highest comparison score being recognized on the coordinates, and outputs the recognition result.

17. The image processing apparatus according to claim 11, wherein the processor is configured with the program to perform operations further comprising:

operation as an image obtaining unit configured to obtain an input image;

operation as an image scale-down unit configured to scale down the obtained input image using the plurality of scale-down factors output by the template information output unit to generate a plurality of scaled-down input images;

operation as a feature quantity calculation unit configured to calculate a feature quantity from each of the generated scaled-down input images, the feature quantity being the same item as the feature quantity calculated by the template generation unit;

operation as a template matching unit configured to search for a position of the object in the scaled-down input image using the template and the feature quantity calculated by the feature quantity calculation unit from the scaled-down input image having the scale-down factor associated with the template, and obtain a plurality of comparison results; and operation as a recognition output unit configured to output a recognition result obtained by integrating the plurality of comparison results.

18. The image processing apparatus according to claim 17, wherein the comparison results comprise coordinates of the object recognized in each scaled-down input image and a comparison score representing a degree of image feature matching between the scaled-down input image and the template on the coordinates, and the processor is configured with the program such that, for different comparison results output on the same coordinates, the recognition output unit determines a template having the highest comparison score being recognized on the coordinates, and outputs the recognition result.

* * * * *